(12) United States Patent
Rozkowski

(10) Patent No.: US 6,966,140 B1
(45) Date of Patent: Nov. 22, 2005

(54) FISH STRIKE SIGNALING APPARATUS

(75) Inventor: Henry Rozkowski, Warren, MI (US)

(73) Assignee: Rozko, Inc., Warren, MI (US)

( * ) Notice: Subject to any disclaimer, the term of this patent is extended or adjusted under 35 U.S.C. 154(b) by 0 days.

(21) Appl. No.: 10/327,808

(22) Filed: Dec. 24, 2002

(51) Int. Cl.[7] ........................................... A01K 97/12
(52) U.S. Cl. ......................................................... 43/17
(58) Field of Search ..................................... 43/17, 16

(56) References Cited

U.S. PATENT DOCUMENTS

| | | | |
|---|---|---|---|
| 2,814,900 A | | 12/1957 | Frazier |
| 3,878,635 A | * | 4/1975 | Trosper et al. .................. 43/17 |
| 4,246,716 A | * | 1/1981 | Elmer ........................... 43/17 |
| 4,447,979 A | * | 5/1984 | Taylor .......................... 43/17 |
| 4,458,437 A | * | 7/1984 | Ou ................................ 43/17 |
| 4,471,555 A | | 9/1984 | Soukup |
| 4,507,890 A | * | 4/1985 | Thorne ......................... 43/17 |
| 4,510,709 A | * | 4/1985 | Melcher ........................ 43/17 |
| 4,541,195 A | | 9/1985 | Delaney |
| 4,586,284 A | * | 5/1986 | Westwood, III ............... 43/17 |
| 4,693,125 A | * | 9/1987 | Krutz et al. ................... 43/17 |
| 4,930,243 A | * | 6/1990 | Lowe et al. ................... 43/17 |
| 5,010,678 A | * | 4/1991 | Peck et al. .................... 43/17 |
| 5,088,223 A | * | 2/1992 | Chu ............................. 43/17 |
| 5,261,180 A | * | 11/1993 | Foster et al. .................. 43/17 |
| 5,321,391 A | * | 6/1994 | Fox .............................. 43/17 |
| 5,396,726 A | | 3/1995 | Zepeda, Sr. |
| 5,682,703 A | * | 11/1997 | Corbiere ....................... 43/17 |
| 5,771,624 A | * | 6/1998 | Vickery et al. ................ 43/17 |
| 5,867,931 A | | 2/1999 | Morris |
| 6,170,189 B1 | * | 1/2001 | Klein ............................ 43/17 |
| 6,463,691 B1 | * | 10/2002 | Atkins .......................... 43/17 |
| 6,708,441 B2 | * | 3/2004 | Dirito .......................... 43/17 |
| 2003/0089020 A1 | * | 5/2003 | Dirito .......................... 43/17 |

FOREIGN PATENT DOCUMENTS

| | | | | | |
|---|---|---|---|---|---|
| DE | 2546482 B1 | * | 4/1977 | | 43/17 |
| DE | 3918171 B1 | * | 12/1990 | | |
| GB | 1502325 B1 | * | 3/1978 | | |
| GB | 2086701 B1 | * | 5/1982 | | |
| GB | 2143711 B1 | * | 2/1985 | | 43/17 |
| GB | 2222060 B1 | * | 2/1990 | | |
| GB | 2307161 B1 | * | 5/1997 | | |
| JP | 6-169674 B1 | * | 6/1994 | | 43/17 |
| JP | 11-127750 B1 | * | 5/1999 | | |
| JP | 2000-4747 B1 | * | 1/2000 | | |
| WO | WO-93/13655 B1 | * | 7/1993 | | 43/17 |
| WO | WO-00/76311 B1 | * | 12/2000 | | |

* cited by examiner

*Primary Examiner*—Darren W. Ark
(74) *Attorney, Agent, or Firm*—Alex Rhodes

(57) ABSTRACT

An easy to use signaling apparatus which can be used during an entire year for warm and cold weather fishing to signal a fisherman that a fish has nibbled, struck or hooked a bait. The signaling apparatus can be used with a variety of fishing rods of different diameters. The signaling apparatus is mounted in surrounding relationship to a fishing rod and includes an adjustment for triggering an LED and/or a buzzer at higher or lower tensile forces in a fishing line caused by a fish nibbling, striking or hooking a line. The signaling apparatus has a high resistance to corrosion, is sensitive to low levels of a tensile force in a fishing line and does not affect the castability of a rod and reel.

12 Claims, 6 Drawing Sheets

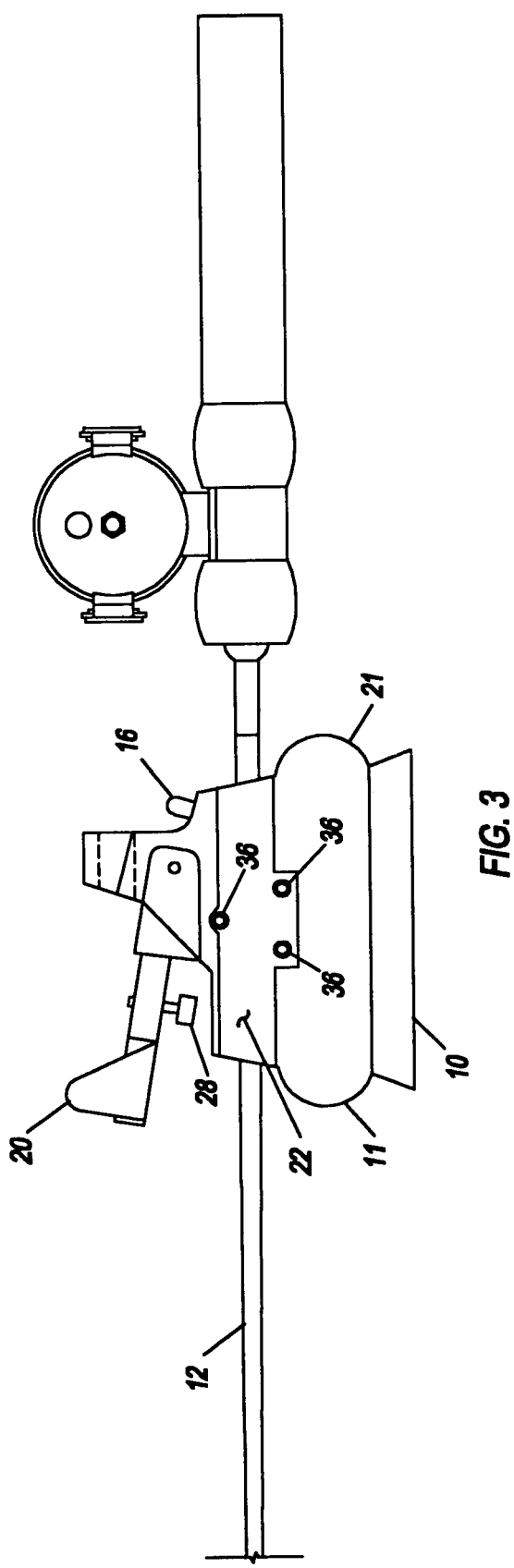
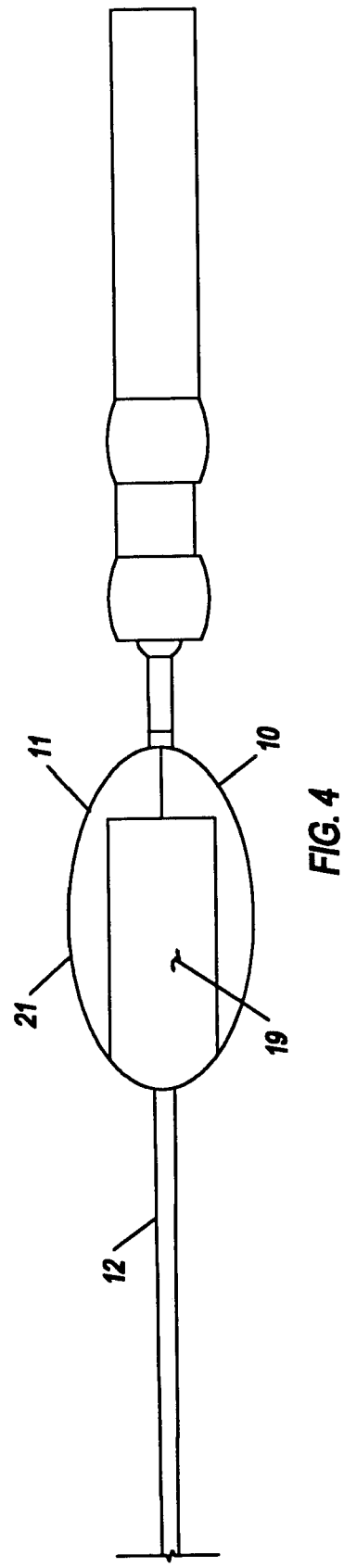
FIG. 3
FIG. 4

| .008 STEEL SPRING |||
|---|---|---|
| TENSION IN LINE (grams) || SCREW TURNS |
| $T_A$ | $T_B$ | |
| 0 | 0.8 | 0 |
| 7.1 | 3.0 | 1/8 |
| 21.3 | 3.0 | 1/4 |
| 42.5 | 3.5 | 3/4 |
| 56.7 | 4.0 | 1 1/8 |
| 113.4 | 2.2 | 1 5/8 |
| 155.9 | 3.0 | 2 1/4 |
| 198.5 | 3.0 | 2 3/4 |
| 241.0 | 4.5 | 3 1/4 |
| 283.5 | 4.4 | 3 5/8 |

| 0.012 STEEL SPRING |||
|---|---|---|
| TENSION IN LINE (grams) || SCREW TURNS |
| $T_A$ | $T_B$ | |
| 0 | 3.0 | 0 |
| 7.1 | 5.0 | 1/16 |
| 21.3 | 5.5 | 1/8 |
| 42.5 | 6.0 | 1/4 |
| 56.7 | 7.0 | 1/2 |
| 113.4 | 7.0 | 3/4 |
| 155.9 | 6.0 | 15/16 |
| 198.5 | 5.0 | 1 1/16 |
| 241.0 | 4.5 | 1 1/2 |
| 283.5 | 5.0 | 1 11/16 |
| 340.2 | 5.5 | 1 15/16 |
| 396.9 | 5.0 | 2 1/4 |
| 453.6 | 6.0 | 2 5/8 |
| 510.3 | 5.5 | 2 15/16 |

FISH STRIKE SIGNALING APPARATUS

FIELD OF THE INVENTION

This invention relates to fishing apparatus and more particularly to a fish strike signaling apparatus for alerting a fisherman that a fish has nibbled, attacked or hooked a bait.

BACKGROUND OF THE INVENTION

Fishing apparatus for warning signaling a fisherman are well known in the art. One object of these apparatus is to free a fisherman of the boredom of waiting for fish to strike at his bait. Another object is to allow the fisherman to use more than a single fishing rod. Another object is to allow a fisherman to perform other tasks such as hooking baits while waiting for a fish to strike. Another object is to allow a fisherman to identify a fishing rod, especially at night, which has been a subject of a nibble or bite.

Numerous drawbacks exist among the warning devices of prior art. Many are simple bells which are incapable of distinguishing between fishing rods. Some have low levels of sensitivity. Thus, opportunities are lost because fishermen have not been alerted in sufficient time to a nibble or strike at a bait. Others are unreliable because of contamination and corrosion. Still others will not accommodate a range of styles and diameters of fishing rods. Still others cannot be used with existing reels and poles. Still others must be reset after every strike.

Still others lack adjustments for levels of sensitivity. Sensitivity adjustments are essential to compensate for differences in fishing conditions and weight. Still others are prohibitively costly. Still others impede castability by requiring actions such as resetting alarms, clipping fishing lines and closing switches during casting.

U.S. Pat. Nos. 2,814,900; 4,471,555; 4,541,195; 5,396,726; and 5,867,931 are exemplary of signaling devices in the prior art. U.S. Pat. No. 2,814,900 discloses a signaling device on the side of a fishing reel. When a fish strikes a fishing line, an electromagnet activates a light and/or buzzer.

U.S. Pat. No. 4,471,555 discloses a signaling device suspended below a fishing rod. When a bite occurs, the tension in a fishing line closes an electrical circuit to activate a visual or aural warning.

U.S. Pat. No. 4,541,195 discloses a fish bite signaling device that is integral with a fishing rod. U.S. Pat. No. 5,396,726 discloses a fish bite signaling device mounted above a fishing rod having a visual signal which is activated by a micro switch. U.S. Pat. No. 5,867,931 discloses a fish strike signaling device having visual and audible signals activated by a switch.

None of the above references provide a means for mounting a signaling apparatus in surrounding relationship to a range of fishing rod diameters.

SUMMARY OF THE INVENTION

With the foregoing drawbacks in mind, the objects of the present invention are to mount a signaling apparatus in surrounding relationship to a range of fishing rod diameters, and to provide a fish strike signaling apparatus which is easy to use and has minimum, if any, effect on castability. It is another object to provide a signaling apparatus which can be used during an entire year for various types of fishing.

The present invention of fish strike signaling apparatus comprises a housing in surrounding relationship to a fishing rod, a sensor for actuating a apparatus when a fish nibbles, attacks or hooks a bait, and a timing means for defining a duty cycle for the signal.

One important benefit of the invention is that it can detect low levels of tension in a fishing line. The high sensitivity allows a fisherman to act almost instantly when a fish nibbles on a bait attached to a fishing line. Another important benefit is that it can be used with a variety of large and small diameter fishing rods of many fisherman. Another important benefit is that unless conditions substantially change, the invention requires only a single sensitivity adjustment. The elimination of further actions provides a high level of castability.

A still further benefit is high reliability from features which make the apparatus free from the effects of contamination and corrosion. Another important benefit is that, once installed, it can remain installed and used year round for ice as well as warm weather fishing. Still yet another benefit is that it automatically resets itself after a nibble, strike or hook of a fish.

In a first aspect of the invention, a timing circuit is triggered by a single pole single throw switch (SPST) when a fish nibbles, strikes or hooks a bait. A "user friendly" sensitivity adjustment allows a fisherman to detect the slightest nibble of a fish. The triggering of the timing circuit sets off an LED and buzzer which attract a fisherman's attention and identifies the rod which has been affected.

In a second aspect of the invention, a reed switch is closed by a magnet on a leaf spring when a fish nibbles, strikes or hooks a bait. The closing of the reed switch activates the LED and/or a buzzer. One feature of the reed switch is a "built-in" time delay which provides sufficient "on time" for the LED and/or buzzer. The closing of the reed switch is adjustable for detecting nibbles, strikes and bites as low as one gram.

In employing the teaching of the present invention, a plurality of alternate constructions can be adopted to achieve the desired objects and capabilities. In this disclosure, one preferred embodiment is described. However, the disclosed embodiment is intended as an example only and should not be considered as limiting the scope of the invention.

Further objects, features and benefits will be apparent by reference to the drawings and ensuing detailed description of a preferred embodiment which discloses the best mode contemplated in carrying out the invention. The exclusive rights which are claimed are set forth in the numbered claims following the detailed description of the preferred embodiment.

BRIEF DESCRIPTION OF THE DRAWINGS

The invention will be better understood and further objects, characterizing features, details and advantages thereof will appear more clearly with reference to the diagrammatic drawings illustrating a preferred embodiment of the invention by way of non-limiting example only.

FIG. 3 is a left side view of the signaling apparatus and fishing pole.

FIG. 4 is a bottom view of the signaling apparatus and fishing pole.

DETAILED DESCRIPTION OF A PREFERRED EMBODIMENT

Figure 1:
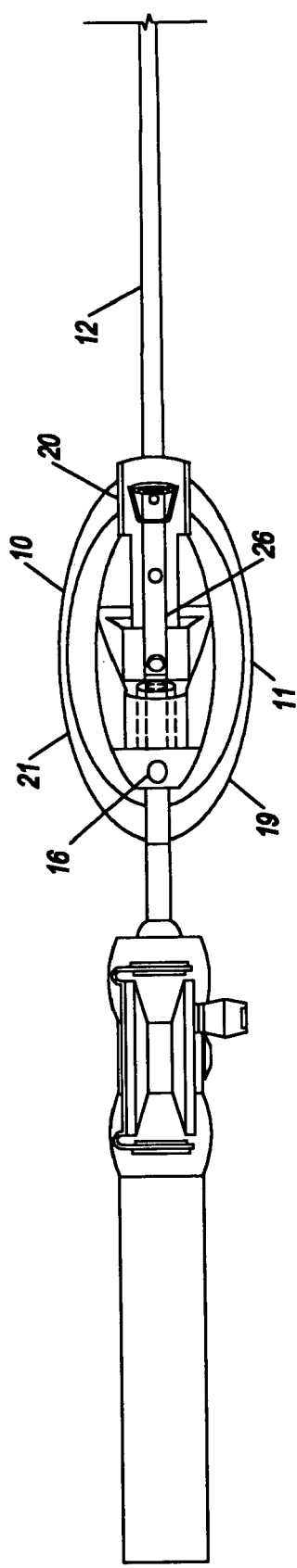
FIG. 1 is a plan view of a first aspect of a fish strike warning signaling apparatus mounted on a fishing pole according to the invention.
Figure 2:
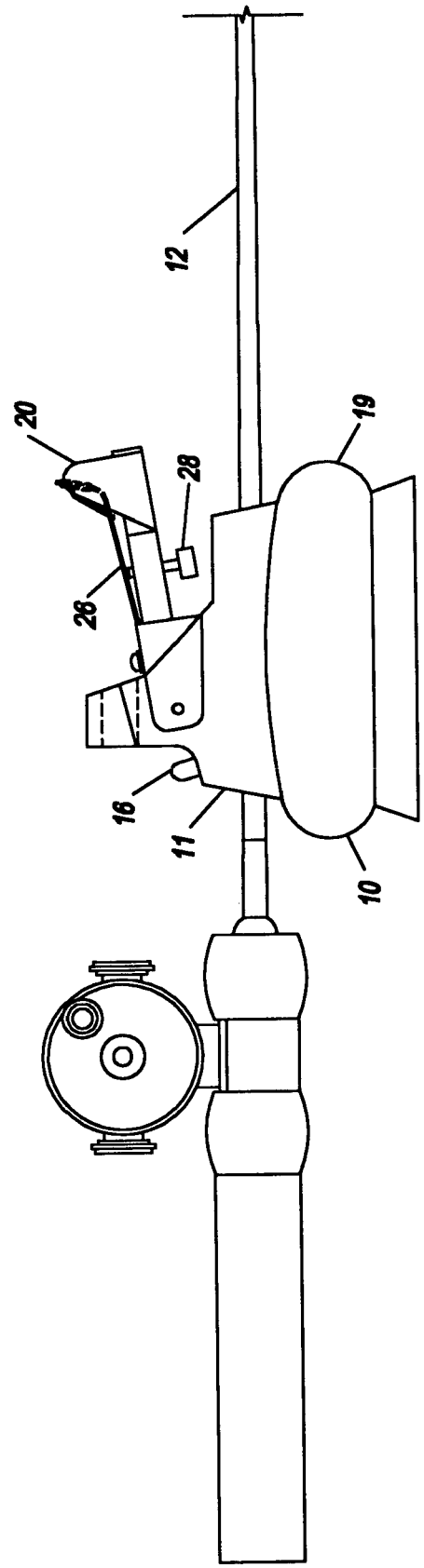
FIG. 2 is a right side view of the signaling apparatus and fishing pole.

Referring now to the drawings wherein like numerals designate like and corresponding parts throughout the several views, a first aspect of a fish strike signaling apparatus 10 and a fishing rod 12 is shown in FIGS. 1 through 5, inclusive, for purposes of disclosing the invention. One feature of the signaling apparatus 10 is that it is in surrounding relationship to the fishing rod 12. One benefit of the signaling apparatus 10 is that it is capable of detecting low level nibbles, strikes and bites. Still yet another benefit is that it provides visual and aural warnings.

Still yet another benefit is that it incorporates an easy to use sensitivity adjustment. This allows a fisherman to tailor the signaling apparatus 10 for the type of fishing and to compensate for such variables as floats and water currents. Still yet another benefit is that the same signaling apparatus 10 can be used with a wide range of fishing rods having different diameters. Still yet another benefit is that the signaling apparatus 10 can be used an entire year for such diverse types of fishing as ice fishing, warm water still fishing, trolling and casting.

The signaling apparatus 10 is comprised of a housing 11, a battery power supply 13, a single pole/single throw (SPST) "on/off" switch 14, a simple "make and break" triggering switch 15, a light emitting diode (LED) 16 and/or buzzer 17 and a timing circuit 18. One distinguishing feature of the invention is that the signaling apparatus 10 is mounted in surrounding relationship to a fishing rod 12. Another distinguishing feature is a flat pedestal base. This feature is useful for supporting fishing rods on ice. Another benefit of the signaling apparatus 10 is that it can be located anywhere along the rod 12. This is important to preserve the balance of the rod 12.

Figure 5:
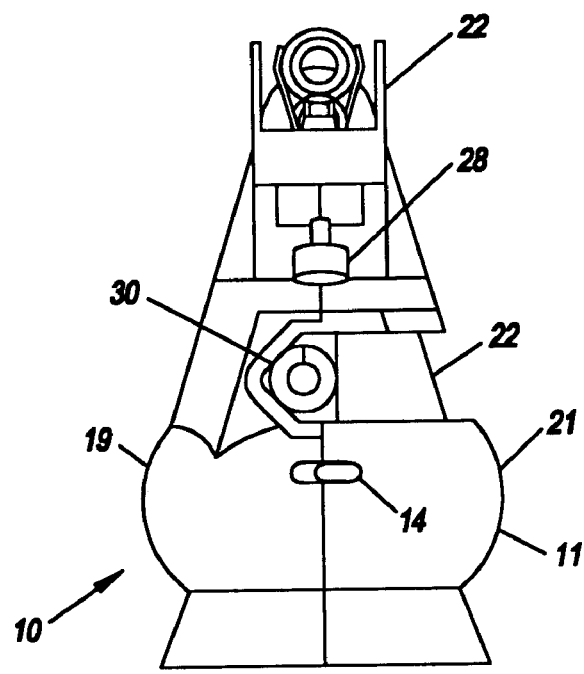
FIG. 5 is a front view of the signaling apparatus.
Figure 6:
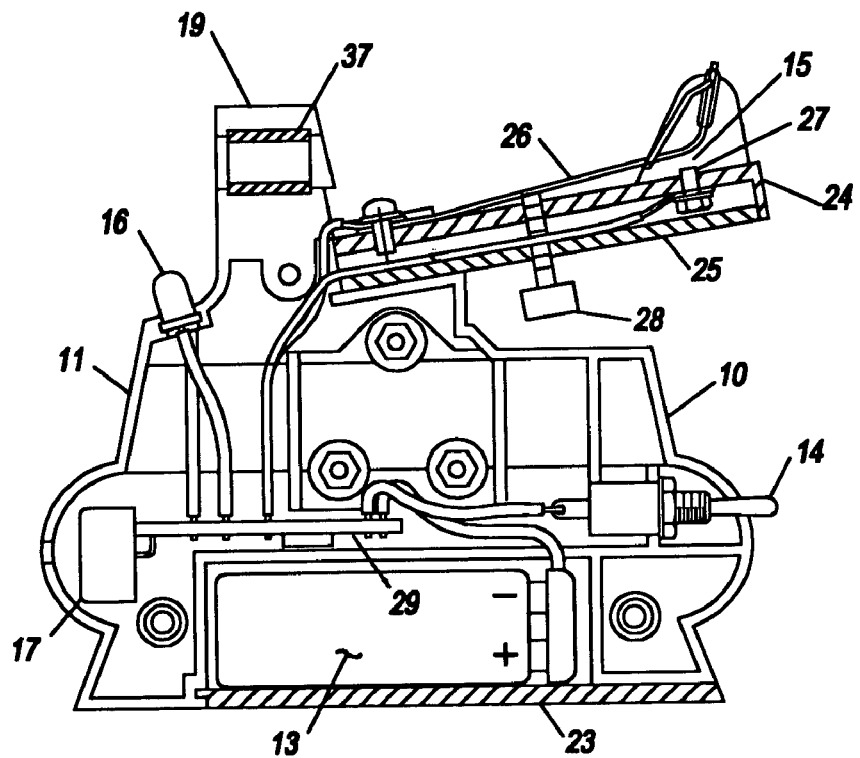
FIG. 6 is a longitudinal view through the signaling apparatus showing the arrangement of components in an interior of the signaling apparatus.

The design of the housing 11 is best understood by reference to FIGS. 1 and 5. The housing 11 is low in weight and consists of a base 19 for mounting components, a cover 21, a switch arm 20 which is fixed to the base 19 and cover 21, a rod clamping member 22 which is fixed to the cover, a split rubber sleeve 30 and a battery cover 23. The battery cover 23 is slidably mounted in the bottom of the housing 11. The base 19, cover 21 and battery cover 23 are preferably molded from a polymer. The battery 13, the LED 16, the buzzer 17, the on/off switch 14 and a timing circuit 18 are mounted in the housing 11. The arrangement of these components in the housing 11 is shown in FIG. 5.

The cover 21 is attached to the base 19 with fasteners which clamp the cover 21 to the base 19. One of the fasteners also retains the switch arm 20 to the cover 21 and the base 19. The switch arm 20 consists of a channel shaped member 24 and a plate 25. The SPST triggering switch 15 is attached to the switch arm 20 and closes when the force of a fishing line 40 is applied to a cantilevered leaf spring 26.

As will be later shown, the triggering switch 15 is capable of providing high levels of sensitivity. Tests have shown that the switch 15 can be adjusted to detect low level nibbles, strikes and hooks which produce a tensile force in the fishing line 40 of as low as one gram. The triggering switch 15 consists of the thin cantilevered leaf spring 26 mounted on the channel shaped member 24, a fixed contact 27 below the leaf spring 26 mounted on the plate 25 and an adjusting thumb screw 28. The adjusting screw 28 sets the tension in the fishing line 40 for closing the switch 15.

Figure 7:
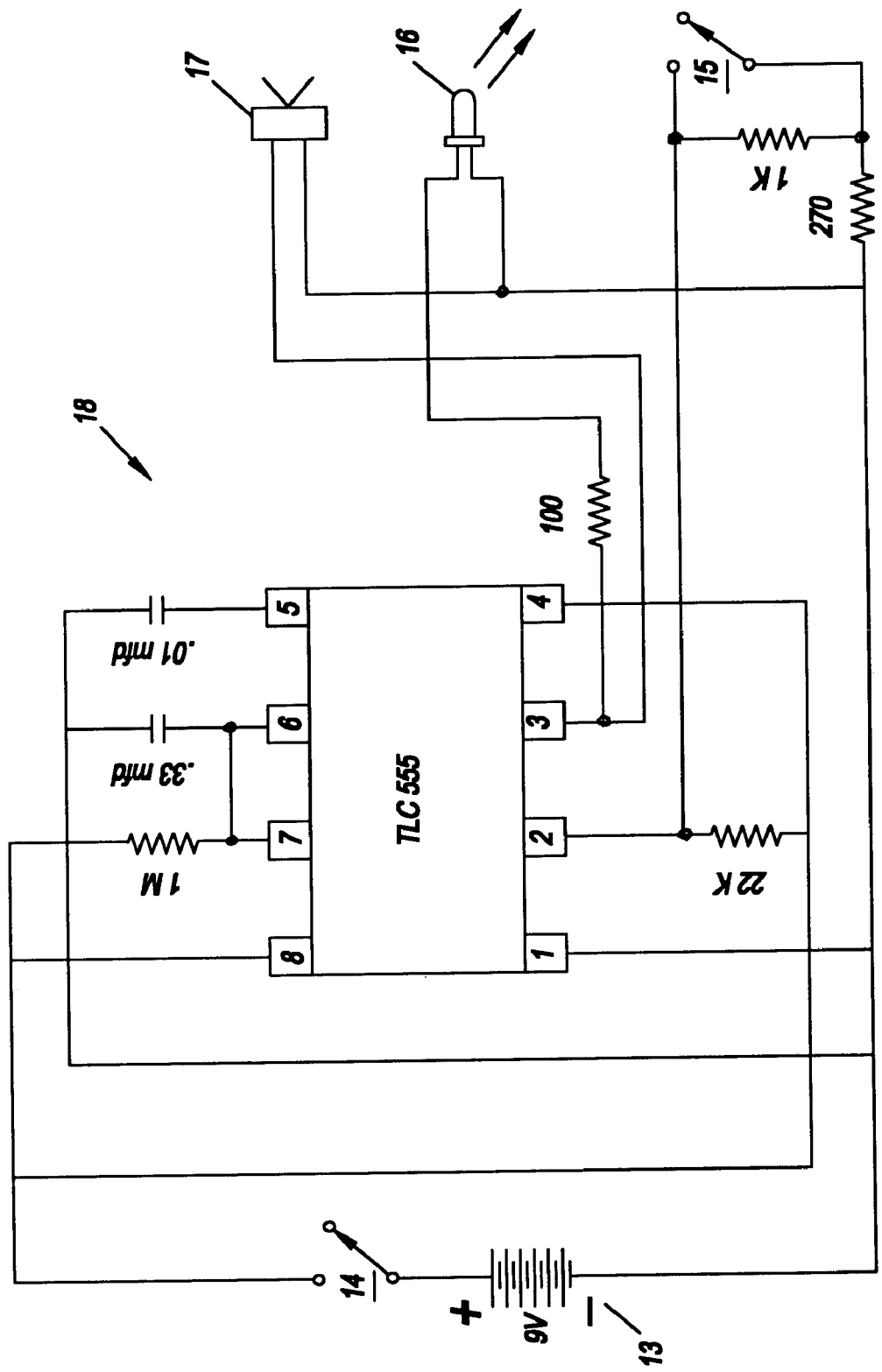
FIG. 7 is a schematic diagram of a signaling circuit.

The leaf spring 26 and fixed contact 27 are plated to resist corrosion. The closing of the switch 15 activates the timing circuit 18 which is mounted on a printed circuit board 29 inside of the housing 11. The timing circuit 18 operates the LED 16 and/or buzzer 17. A schematic diagram of a suitable timing circuit 18 is shown in FIG. 7. The circuit 18 is based on the popular 555 IC chip. The 555 IC chip is a multipurpose chip that operates with power supply voltages of 5 to 18 Vdc. When switch 15 closes, the output of the timer 18 goes high to activate the LED 16 and buzzer 17.

Figure 8:
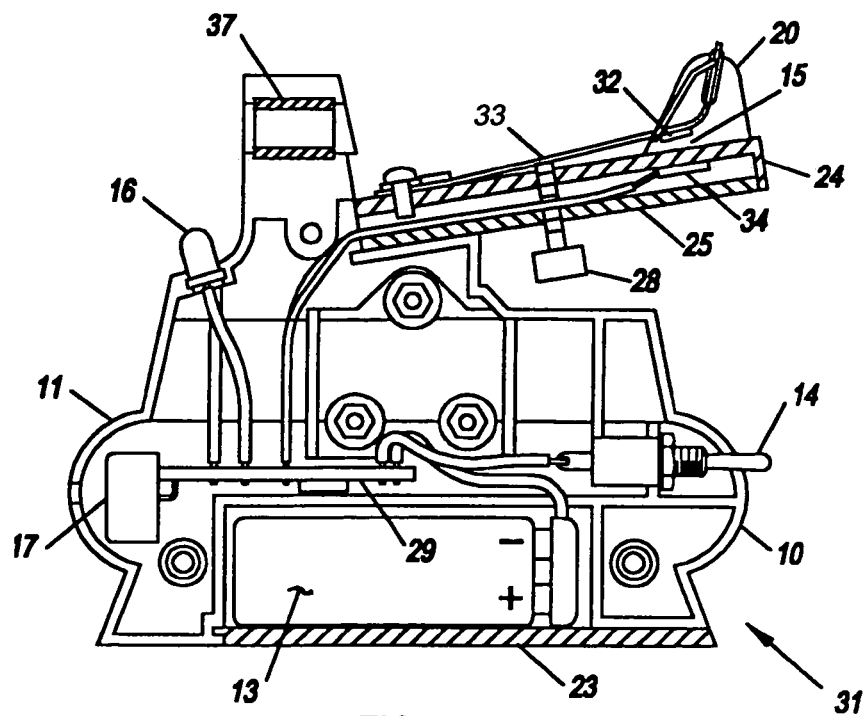
FIG. 8 is a longitudinal view through a second aspect of the signaling apparatus showing the arrangement of components in an interior of the signaling apparatus.

With reference to FIG. 8, a second aspect 31 of the invention is similar to the first aspect except for a substitution of the triggering switch 15 of the first aspect 10 with a "non-contact" reed switch 34 and the elimination of the 555 IC chip and associated resisters and capacitors. One feature of the reed switch 34 is a "built-in" lag for opening the switch 34. The "built-in" lag results from the "pull in" distance for closing the switch 34 being less than the "drop out" distance for closing the switch 34. This "built-in" lag provides sufficient LED 16 and buzzer 17 "on times" to identify a rod 12 which has been affected by a fish.

Figure 9:
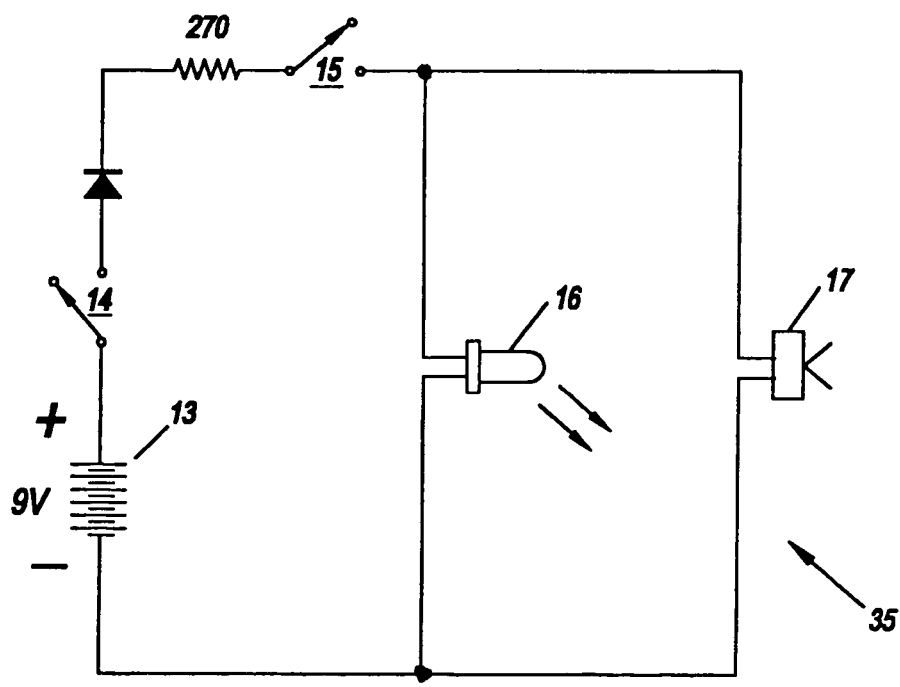
FIG. 9 is a schematic diagram of a signaling circuit for the second aspect.

The reed switch 34 closes when a magnet 32 which is attached to an end of a leaf spring 33 is sufficiently close to the switch 34. In FIG. 9, a schematic of a circuit 35 is shown for the second aspect 31 in which a simple battery is in series with the reed switch 34, LED 16 and buzzer 17. A reed switch 34 which is exemplary of a reed switch with a "built-in" lag is MEDLER Electronic AG (www.meder.com) of Engen/Weischingen, Germany model MK-20 and is incorporated herein by reference.

The invention is used in the following manner. The signaling apparatus 10 is mounted on a fishing rod by removing the screws 36 which fix the clamping member 22 to the housing 11, installing the split rubber sleeve 30 around the fishing rod 12, placing the fishing rod 12 in the housing 11, and re-installing the clamping member 22 and screws 36. The fishing line 40 is then passed through a bushing 37 on the upper end of the housing 11 and the usual eyelets which exist on the fishing rod 12. Floats, sinkers, hooks, and baits are installed in the usual manner on an end portion of the fishing line 40. The triggering switch 15 is then adjusted to meet the fisherman's needs.

An adjustment of the triggering switch 15 is a two step process. The initial step consists of determining the point at which the LED 16 and buzzer 17 are activated under static conditions. With the fishing line 40 suspended such that weights of components on the fishing line 40 act on the line 40, the adjusting screw 28 is slowly rotated to the point where the LED 16 and buzzer 17 are activated. After this point is determined, the adjusting screw 28 is rotated an additional small amount to compensate for additional loads from dynamic loading.

The second step is to determine when the LED and buzzer are set off under dynamic loads from conditions, such as currents, casting or trolling. This requires a rod to be used under fishing conditions, such as still fishing, casting, trolling, etc. When the line 40 is loaded in water, the LED 16 and buzzer 17 become active and adjusting screw 28 is turned by incremental amounts to de-activate the LED 16 and buzzer 17.

When this point is reached, the adjusting screw 28 is turned by an additional small increment to compensate for buoyancy and the additional loads of nibbling, striking or hooking by a fish. As a final step it may be necessary to tighten the adjustment screw further if inadvertent setting off of the alarms, 16, 17 occur.

Inasmuch as the sensitivity of the signaling apparatus depends upon the final increment of rotation of the adjustment screw 28, the final increment should be held to a minimum. After the final increment is added, it should not be necessary to change the adjustment unless conditions substantially change. If desired, the first step of the adjustment process can be deleted and the adjustment limited to actual dynamic conditions.

Figures 10, 11, 12:
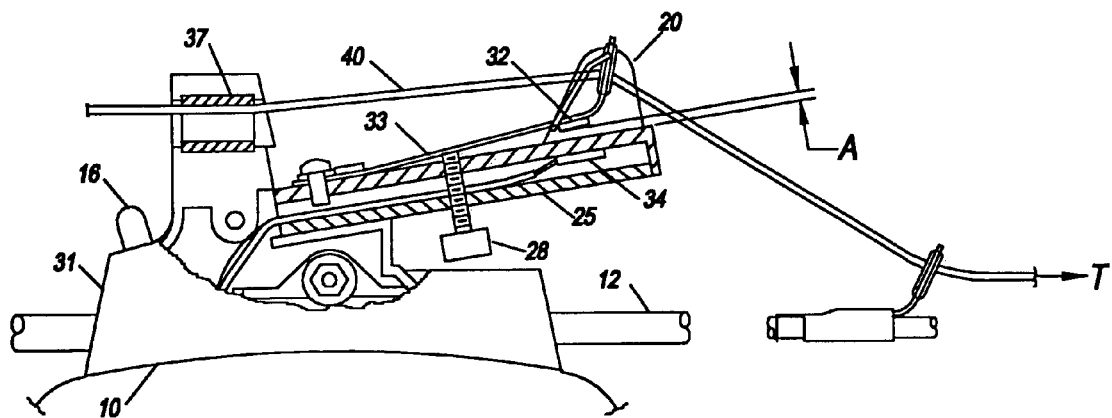
FIG. 10 is an enlarged partial right side view of the second aspect.
FIG. 11 is a first chart which depicts the sensitivity of the second aspect.
FIG. 12 is a second chart for depicting the sensitivity of the second aspect.

With reference to FIGS. 10 through 12, sensitivity tests were conducted with the second aspect of the invention 31. In FIG. 10, the letter "A" designates the gap of the reed switch which is controlled by the adjustment screw 28. The letter "T" represents the tensile force in the fishing line 40 to activate the LED 16 and buzzer 17. An NF 440 adjustment screw 28 was used for the test. Two leaf springs 33 were evaluated. The first leaf spring 33 was 0.008" thick and was deemed suitable for light conditions, such as still fishing from a boat and ice fishing. The second leaf spring 33 was 0.012" and was deemed suitable for heavy conditions, such as casting, trolling and high currents.

For each test, the number of screw turns, the load "$T_A$" for de-activating the LED 16 and buzzer 17 and the incremental operating load "$T_B$" at a constant switch gap "A" were recorded. It will be observed that sensitivity over a wide range of switch settings (screw turns) is high and nearly constant, i.e. 3.0 to 4.4 grams for the 0.008" thick spring and 5.0 to 6.0 grams for the 0.012" thick spring.

From the foregoing, it is apparent that my invention is a highly effective, simple to use signaling apparatus for alerting a fisherman that a fish has nibbled, struck or hooked on a bait. It is further apparent that my invention can be used year round with different diameter fishing rods.

Although only two embodiments of my invention have been disclosed it is not my intention to limit the scope of my invention to these embodiments, since other embodiments can be derived with changes in shape, arrangement, inversion, and substitution of parts which are known to persons skilled in the art without departing from the spirit thereof.

I claim:

1. In combination with a fishing rod, a stand alone fish strike signaling apparatus for alerting a fisherman when a fish has nibbled, struck or become caught on a bait comprising: an ovate shaped housing, clamped in surrounding relationship to said fishing rod, said housing having an outward extending planar lower surface for supporting said signaling apparatus on a surface; an arm extending forward from an upper portion of said housing; a means for clamping said housing to said fishing rod; means for responding to a tensile force in a fishing line to signal said fisherman when said fish has nibbled, struck or become caught on said bait comprising a thin leaf spring mounted on said arm.

2. The combination set forth in claim 1 further comprising a mechanical means for adjusting a force required to deflect said leaf spring for signaling said fisherman at higher or lower tensile forces in said fishing line that said fish has nibbled, struck or become caught on said bait.

3. The combination set forth in claim 1 wherein said means for responding to a tensile force in said fishing line to signal said fisherman when said fish has nibbled, struck or become caught on said bait further comprises: a battery; an LED; a normally open switch for triggering said means for responding to a tensile force in a fishing line to signal said fisherman; and a magnet mounted on said thin leaf spring for closing said normally open switch when said fish nibbles, strikes, or becomes caught on said bait.

4. The combination set forth in claim 3 wherein said normally open switch is a simple "make and break" switch.

5. The combination set forth in claim 4 further comprising a timing circuit for controlling an "on time" of said LED.

6. The combination set forth in claim 3 wherein said normally open switch is a "non-contact" reed switch.

7. The combination set forth in claim 6 wherein said reed switch has a "built-in" lag for extending a time for signaling of said fisherman when said fish has nibbled, struck or become caught on said bait.

8. The combination set forth in claim 3 further comprising a buzzer.

9. The combination set forth in claim 1 wherein said means for responding to a tensile force in a fishing line to signal said fisherman when said fish has nibbled, struck or become caught on said bait includes an LED and a buzzer.

10. In combination with a fishing rod, a stand alone fish strike signaling apparatus for alerting a fisherman that a fish has nibbled, struck or become caught on a bait comprising: a housing in clamping relationship to said fishing rod, said housing having a base; said base having a planar lower surface for supporting said signaling apparatus on a surface; a cover for enclosing an opening in said base; a clamping means for clamping said signaling apparatus to said fishing rod, a forward extending arm attached to an upper portion of said housing; a thin leaf spring mounted on said forward extending arm; a permanent magnet mounted on an end portion of said thin leaf spring for closing a reed switch; a single pole-single throw "on/off" switch mounted in said housing for activating said signaling apparatus; and a reed switch mounted in said forward extending arm, co-acting with said magnet for activating said signaling apparatus when a tensile force in a fishing line reaches a predetermined value, said reed switch having a "built-in" lag for extending a time for signaling of said fisherman when said fish has nibbled, struck or become caught on said bait.

11. The combination recited in claim 10 wherein said reed switch is mounted below said magnet in said forward extending arm, said flexible leaf spring being directly responsive to said tensile force to move said magnet toward said reed switch to signal said fisherman that said fish has nibbled, struck or become caught on said bait.

12. The combination recited in claim 11 further comprising a means for adjusting a sensitivity of said leaf spring to activate said signaling apparatus at higher or lower tensile forces in said fishing line.

* * * * *